United States Patent [19]

Dove

[11] Patent Number: 5,030,039

[45] Date of Patent: Jul. 9, 1991

[54] APPARATUS AND METHOD FOR INSTALLING A THERMOMETER-RECEIVING WELL WITHIN A FLUID SERVICE PIPE

[76] Inventor: Gurry L. Dove, 11870 Triadelphia Rd., Ellicott City, Md. 21043

[21] Appl. No.: 529,553

[22] Filed: May 29, 1990

[51] Int. Cl.⁵ .................. B23B 41/08; F16K 43/00
[52] U.S. Cl. ..................... 408/1 R; 131/15; 131/318; 408/72 R
[58] Field of Search ............. 408/1 R, 204, 206, 209, 408/87, 92, 72 R; 137/15, 318

[56] References Cited

U.S. PATENT DOCUMENTS

| | | | |
|---|---|---|---|
| 2,097,398 | 10/1937 | Polston et al. | 137/318 |
| 2,151,594 | 3/1939 | Grantham | 137/318 |
| 2,870,629 | 1/1959 | Willis | 137/318 |
| 3,773,067 | 11/1973 | Ray | 137/318 |
| 3,995,655 | 12/1976 | Sands | 408/92 |
| 4,331,170 | 5/1982 | Wendell | 137/318 |

Primary Examiner—Daniel W. Howell
Attorney, Agent, or Firm—Donald A. Kettlestrings

[57] ABSTRACT

Apparatus and method for installing a thermometer-receiving well within a fluid service pipe without interrupting the service in the pipe. A rod member is provided which defines a first end for removably receiving a cutting member for cutting through the fluid service pipe. The cutting member is then removed from the rod member and a connecting member is removably attached to the first end of the rod member in place of the cutting member. The connecting member is adapted to removably receive a thermometer well whereby the rod member can be used to cut through the fluid service pipe and to install the thermometer-receiving well within the fluid service pipe without interrupting the service in the pipe.

12 Claims, 1 Drawing Sheet

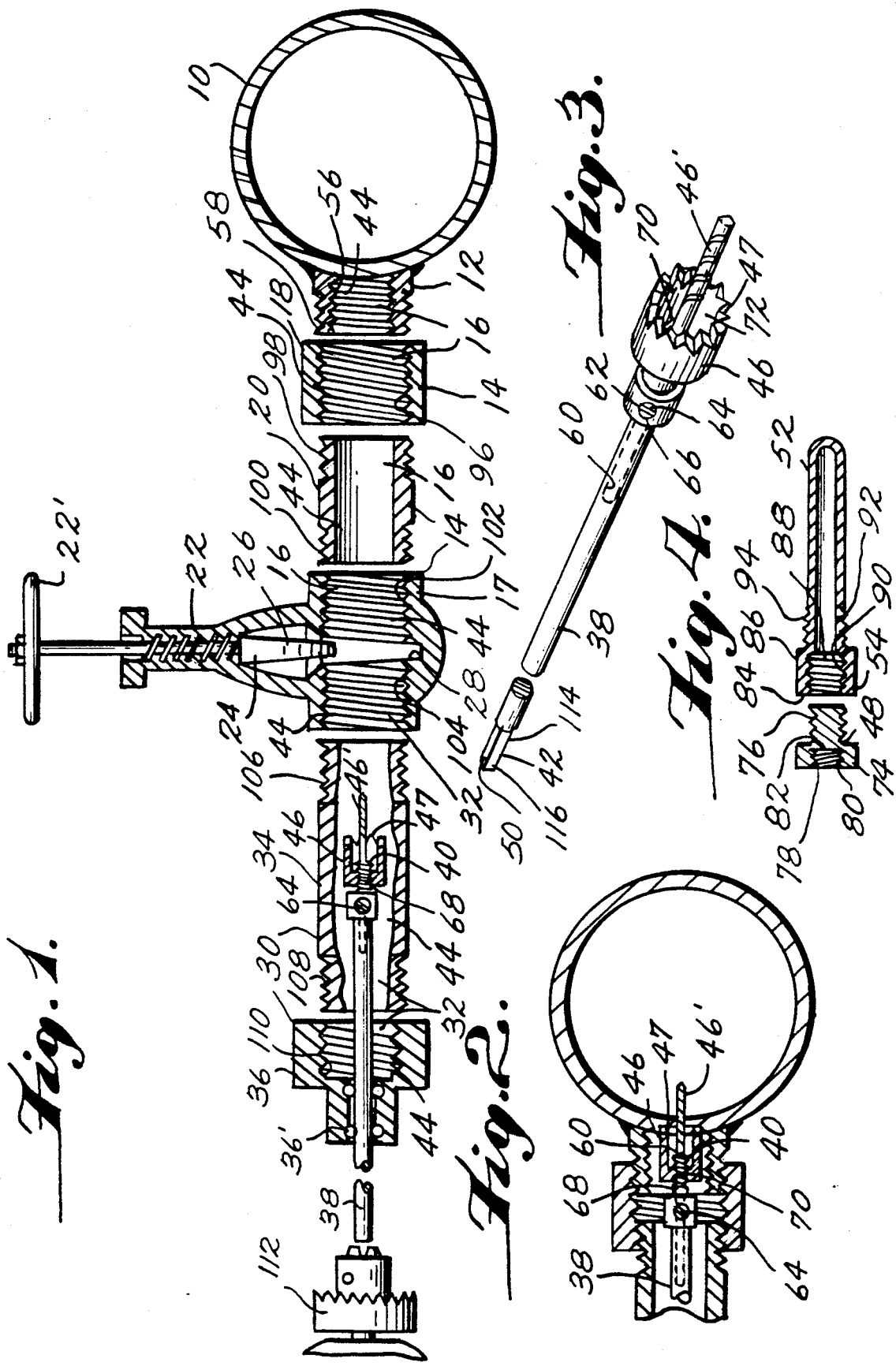

APPARATUS AND METHOD FOR INSTALLING A THERMOMETER-RECEIVING WELL WITHIN A FLUID SERVICE PIPE

This invention relates to a method and apparatus for installing a thermometer-receiving well within a fluid service pipe without interrupting service in the pipe.

It is an object of the present invention to provide an apparatus and method for quickly and easily installing a thermometer-receiving well within a fluid service pipe.

Another object is to provide such a method and apparatus wherein installation of the thermometer-receiving well is accomplished without interrupting service in the pipe.

Still another object is to provide such a method and apparatus wherein a single rod member can be used for cutting a hole in the service pipe and for installing the thermometer-receiving well in fluid-tight relationship with the pipe.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention includes a hollow, open-ended, nipple member connected in fluid-tight relationship with an outer wall of a fluid service pipe; first means in operative relationship with the nipple member for creating a first predetermined space in fluid communication with the interior of the nipple member; second means in operative relationship with the first means for selectively isolating the first space; third means in operative relationship with the first means for creating a second predetermined space in substantially axial alignment and fluid communication with the first space; a rod member, defining first and second ends, for use in cooperation with the third means and in cooperation with the first means for selectively creating a third isolated space formed by the first and second spaces combined; a cutting member removably attachable to the first end of the rod member; a connecting member removably attachable to the first end of the rod member in place of the cutting member; means in operative relationship with the second end of the rod member for enabling removable connection of the rod member to a conventional drill; and the thermometer-receiving well defining a first end configured for removable attachment of the well to the connecting member and configured for fluid-tight attachment of the well to the nipple member.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 1 is an exploded elevation view, partly in fragmentary section, showing the apparatus of this invention prior to forming an opening in the wall of a fluid service pipe;

FIG. 2 is a fragmentary sectional view of the apparatus showing cutting members forming an opening in the wall of a fluid service pipe;

FIG. 3 is a fragmentary perspective view of a rod member of the invention with cutting members attached thereto; and FIG. 4 is a sectional view of a connecting member and a thermometer-receiving well in accordance with the invention.

With reference now to the drawings, wherein like reference characters designate like or corresponding parts throughout the several views, there is shown a conventional pressurized fluid service pipe 10. Typically, pipe 10 is a steel water pipe, but this invention is applicable to any pipe carrying a pressurized fluid.

In accordance with the invention, a hollow, open-ended, nipple member 12 is connected in fluid-tight relationship with an outer wall of pipe 10. If pipe 10 is made of steel, nipple member 12 is welded to the pipe. If pipe 10 is made of a material other than steel, nipple member 12 can be connected to the pipe in any conventional manner so as to provide a fluid-tight seal between pipe 10 and nipple member 12.

First means 14 are connected in operative relationship with nipple member 12 for creating a first predetermined space 16 in fluid communication with the interior of nipple member 12. More specifically, first means 14 may include a conventional pipe coupling 18, a conventional pipe nipple 20 and a portion 17 of the housing of a conventional gate valve 22.

Second means 24 are provided in operative relationship with the housing of gate valve 22 for selectively isolating first space 16. More specifically, second means 24 includes gate 26 of valve 22 and valve seat 28 of valve 22 whereby gate 26 can be selectively positioned, in a conventional manner, in fluid-tight relationship with respect to seat 28.

Third means 30 are provided in operative relationship with first means 14 for creating a second predetermined space 32 in substantially axial alignment and fluid communication with first space 16. More specifically, third means 30 includes a conventional pipe nipple 34 and a packing nut 36.

A rod member 38, defining a first end 40 and a second end 42, is provided for use in cooperation with packing nut 36 and in cooperation with first means 14 for selectively creating a third isolated space 44 formed by spaces 16 and 32 combined.

Cutting members 46, 46' are removably attachable to first end 40 of rod member 38 for cutting through and forming an opening in the wall of pipe 10. A connecting member 48 also is removably attachable to first end 40 of rod member 38 in place of cutting member 46, and means 50 are provided in operative relationship with second end 42 of rod member 38 for enabling removable connection of the rod member to a conventional drill 112.

A thermometer-receiving well 52 defines a first end 54 that is configured for removable attachment of well 52 to connecting member 48, and end 54 is also configured for fluid-tight attachment of well 52 to nipple member 12. Nipple member 12 is tubular in shape and defines a first inner threaded surface 56 and an opposed second outer threaded surface 58.

First end 40 of rod member 38 defines a first substantially axially aligned, drill-bit receiving opening 60, and means 62 are further provided in operative relationship with opening 60 for selectively removably holding a conventional drill bit 46' in fixed position within opening 60. More specifically, holding means 62 includes a set screw 64 threadably positioned within a threaded opening 66 that is positioned at substantially a right angle with respect to opening 60 whereby set screw 64 can be tightened down, in a conventional manner, against drill bit 46' when the drill bit is inserted into opening 60.

First end 40 of rod member 38 also defines a third outer threaded surface 68. Cutting member 46 is a substantially cylindrically-shaped saw member which defines a fourth inner threaded surface 70 for removable threaded engagement with outer threaded surface 68 of rod member 38. Saw member 46 also defines a hollow, open-ended, axially-aligned opening 72 for slidably receiving drill bit 46' in a non-interference fit.

Connecting member 48 defines a first head element 74, and a first stem element 76 is connected to head element 74. Head element 74 defines a second substantially axially-aligned opening 78 having a fifth threaded inner surface 80 for selective removable threadable engagement with threaded surface 68 of rod member 38.

Stem element 76 of connecting member 48 defines a sixth outer threaded surface 82. A first end 84 of thermometer-receiving well 52 defines a second head element 86 which itself defines a third substantially axially aligned opening 88 having a seventh inner threaded surface 90 for selective removable threadable engagement with threaded surface 82 of stem element 76.

End 84 of well 52 further defines a second stem element 92 connected to head element 86, and stem element 92 defines an eighth outer threaded surface 94 for threadable engagement in fluid-tight relationship with inner threaded surface 56 of nipple member 12.

In operation, nipple member 12 is welded in fluid-tight relationship to steel fluid service pipe 10. Pipe coupling 18, having an interior threaded surface 96, is threaded onto nipple member 12 in a fluid-tight manner with threaded surface 96 engaging outer threaded surface 58 of nipple member 12.

Pipe nipple 20, having opposed exterior threaded ends 98, 100, is threaded in fluid-tight relationship with pipe coupling 18 by threadably engaging surfaces 98 and 96 with each other. Gate valve 22, defining interior threaded surfaces 102, 104, is then attached in fluid-tight relationship with pipe nipple 20 by threadably engaging threaded surfaces 100 and 102 with each other.

Pipe coupling 18 and pipe nipple 20 may be eliminated from the assembly and need not be used if gate valve 22 can be directly threaded onto nipple member 12 without having gate valve handle 22' contact service pipe 10 so as to prevent the gate valve from being completely threaded onto nipple member 12. This may be accomplished, for example, by providing nipple member 12 of sufficient length to avoid contact of handle 22' against service pipe 10 as gate valve 22 is being threaded directly onto nipple 12.

Pipe nipple 34, defining opposed exterior threaded ends 106, 108, is then attached in fluid-tight relationship with gate valve 22 by threadably engaging threaded end 106 with threaded surface 104 of gate valve 22.

Rod member 38, which is preferably comprised of stainless steel, is then inserted into and through packing nut 36. Rod member 38 slidably engages packing glands 36' of packing nut 36 in a conventional manner to provide a substantially fluid-tight seal between rod member 38 and packing glands 36'. Drill bit 46' is inserted into opening 60 of rod member 38, and set screw 64 is tightened to hold the drill bit in fixed position within opening 60. Cutting member 46, which defines cutting teeth 47, is then threaded onto first end 40 of rod member 38 by threadably engaging threaded surface 70 of cutting member 46 with threaded surface 68 of rod member 38.

Packing nut 36 is then attached in fluid-tight relationship with pipe nipple 34 by threadably engaging interior threaded surface 110 of packing nut 36 with threaded end 108 of pipe nipple 34.

Gate valve 22 is opened, and rod member 38, with drill bit 46' and saw member 46 attached thereto, is pushed forwardly until drill bit 46' contacts the outer surface of service pipe 10. A conventional drill 112 is then attached to connection means 50 of rod member 38. Connection means 50 are typically conventional, opposed, flattened surfaces 114, 116 at end 42 of rod member 38. Drill 112 is then energized to rotate rod member 38, saw 46 and drill bit 46'. A small hole is initially formed by drill bit 46' in the wall of pipe 10, and a larger hole is then formed in pipe 10 by the action of saw 46. The use of drill bit 46' and saw 46, in combination, also enables the removed portion or coupon of pipe 10 to be retained on drill bit 46'. As a result, the coupon is not introduced into the interior of pipe 10 or into the fluid stream within pipe 10.

After making the hole in pipe 10, rod member 38, saw 46, drill bit 46' and the coupon removed from pipe 10 are pulled back past gate valve 22. Handle 22' of the gate valve is then turned to cause gate 26 to be moved into substantially fluid-tight relationship with valve seat 28. Packing nut 36 is then removed from pipe nipple 34, and saw 46 and drill bit 46' are removed from rod member 38, or saw 46 with drill bit 46' can be removed from rod member 38 without removing packing nut 36 from pipe nipple 34.

Connecting member 48 is then attached to end 40 of rod member 38 by threadably engaging threaded surface 80 of connecting member 48 with threaded surface 68 of rod member 38. Thermometer well 52 is then attached to connecting member 48 by threadably engaging threaded surface 90 of well 52 with threaded surface 82 of connecting member 48. A conventional anti-seize compound is first applied to threaded surfaces 82, 90 to permit separation of connecting member 48 from well 52 at a later time. Conventional pipe dope is also applied to threaded surface 94 of well 52 to enhance the substantially permanent and fluid-tight contact between threaded surface 94 and threaded surface 56 of nipple member 12.

Packing nut 36 is then reattached in fluid-tight relationship with pipe nipple 34, if they previously have been separated, and pipe nipple 34 is reattached in fluid-tight relationship with gate valve 22. Gate valve 22 is reopened, and rod member 38, with well 52 attached, is pushed through the assembly until well 52 is passed through the opening previously formed in pipe 10. Threaded surface 94 of well 52 then engages threaded surface 56 of nipple member 12. Rod member 38 is then carefully rotated until well 52 is firmly and tightly threaded onto nipple member 12.

Rod member 38 and connecting member 48 are then rotated in a reverse direction and they are unscrewed from well 52 by separating threaded surface 82 of connecting member 48 from threaded surface 90 of well 52. The previous application of anti-seize compound on threaded surfaces 82 and 90 and the previous application of pipe dope on threaded surface 94 permits connecting member 48 to be removed from well 52 while well 52 remains firmly and tightly threadably attached to nipple member 12 in a fluid-tight manner.

The entire assembly can then be removed, by separating and removing the elements of the assembly, leaving only well 52 connected in fluid-tight relationship with nipple member 12. Well 52 can then be further tightened onto nipple member 12 by using a conventional hand wrench (not shown) on head element 86, which head element may be of a conventional hexagonal shape to accommodate a conventional wrench. Thermometer-receiving well 52 is then in position within service pipe 10 for receiving a conventional thermometer or sensing bulb which can be inserted into the well through opening 88 at first end 54 of the well.

The invention in its broader aspects is not limited to the specific details shown and described, and departures may be made from such details without departing from the principles of the invention and without sacrificing its chief advantages.

What is claimed is:

1. Apparatus for installing a thermometer-receiving well within a fluid service pipe without interrupting the service in the pipe, said apparatus comprising:
   a hollow, open-ended, nipple member connected in fluid-tight relationship with an outer wall of said pipe;
   first means in operative relationship with said nipple member for creating a first predetermined space in fluid communication with the interior of said nipple member;
   second means in operative relationship with said first means for selectively isolating said first space;
   third means in operative relationship with said first means for creating a second predetermined space in substantially axial alignment and fluid communication with said first space;
   a rod member, defining first and second ends, for use in cooperation with said third means and in cooperation with said first means for selectively creating a third isolated space formed by said first and second spaces combined;
   a cutting member removably attachable to said first end of said rod member;
   a connecting member removably attachable to said first end of said rod member in place of said cutting member;
   means in operative relationship with said second end of said rod member for enabling removable connection of said rod member to a conventional drill; and
   said thermometer-receiving well defining a first end configured for removable attachment of said well to said connecting member and configured for fluid-tight attachment of said well to said nipple member.

2. Apparatus as in claim 1 wherein said nipple member is tubular in shape and defines a first inner threaded surface and an opposed second outer threaded surface.

3. Apparatus as in claim 2 wherein said first end of said rod member defines a first substantially axially-aligned drill-bit receiving opening, and further including means in operative relationship with said drill-bit receiving opening for selectively removably holding a drill bit in fixed position within said opening.

4. Apparatus as in claim 3 wherein said first end of said rod member defines a third outer threaded surface.

5. Apparatus as in claim 4 further including a substantially cylindrically-shaped saw member defining a fourth inner threaded surface for removable threaded engagement with said third outer threaded surface of said rod member.

6. Apparatus as in claim 5 wherein said saw member defines a hollow, open-ended, axially-aligned opening for receiving said drill bit.

7. Apparatus as in claim 5 wherein said connecting member defines a first head element and a first stem element connected to said head element, said head element defining a second substantially axially-aligned opening having a fifth inner threaded surface for selective removable threadable engagement with said third threaded surface of said rod member, and said stem element defining a sixth outer threaded surface.

8. Apparatus as in claim 7 wherein said first end of said well defines a second head element defining a third substantially axially aligned opening having a seventh inner threaded surface for selective removable threadable engagement with said sixth threaded surface of said first stem element, and a second stem element connected to said second head element, said second stem element defining an eighth outer threaded surface for threadable engagement in fluid-tight relationship with said first inner threaded surface of said nipple member.

9. Apparatus as in claim 8 wherein said pipe is made of steel and wherein said nipple member is welded to said pipe.

10. A method of installing a thermometer-receiving well within a fluid service pipe without interrupting the service in the pipe, including the steps of:
   attaching a hollow, open-ended, internally threaded nipple member in fluid-tight engagement with an outer wall of said pipe;
   creating a first predetermined space in fluid communication with the interior of said nipple member;
   isolating said space by pushing a rod member into said space;
   removably attaching a cutting member to said rod member;
   pushing said rod member and said cutting member through said isolated space and through said nipple member until said cutting member contacts said outer wall of said pipe;
   turning said rod member and said cutting member and cutting a hole through said outer wall;
   pulling said rod member and said cutting member through said space to a predetermined position within said space and outside the boundaries of a second space which is a portion only of said first isolated space;
   isolating said second space;
   creating a third isolated space which is a portion only of said first isolated space;
   deisolating said third space;
   removing said cutting member from a first end of said rod member;
   removably attaching a connecting member to said first end of said rod member;
   removably attaching a threaded thermometer-receiving well to said connecting member;
   recreating said third isolated space;
   recreating said first isolated space which consists of said second space and said third space;
   pushing said rod member, said connecting member and said well through said first isolated space until said threads of said well contact said internal threads of said nipple member;
turning said rod member, said connecting member and said well in a first direction to threadably engage said well and said nipple member in fluid-tight relationship with each other;
turning said rod member and said connecting member in a second direction to threadably disengage said connecting member from said well; and
deisolating said first, second and third spaces.

11. A method as in claim 10 further including the step of:
applying an anti-seize material between said connecting member and said well before removably attaching said connecting member to said well.

12. A method as in claim 11 further including the step of:
applying pipe dope or other material of like or similar properties between said well and said internal threads of said nipple member before threadably engaging said well and said nipple member in fluid-tight relationship with each other.

* * * * *